United States Patent

[11] 3,592,220

| | | | |
|---|---|---|---|
| [72] | Inventor | Richard F. Reinke |  |
| | | P.O. Box 272, Deshler, Nebr. 68340 | |
| [21] | Appl. No. | 838,089 | |
| [22] | Filed | July 1, 1969 | |
| [45] | Patented | July 13, 1971 | |

[54] LINEAR IRRIGATION SYSTEM WITH PICKUP SHOE
13 Claims, 15 Drawing Figs.

[52] U.S. Cl. .................................................... 137/344, 239/212
[51] Int. Cl. ...................................................... B05b 9/02, E01h 3/02
[50] Field of Search............................................ 137/344, 525.5, 525.7; 239/212, 213

[56] References Cited
UNITED STATES PATENTS

| 2,730,115 | 1/1956 | Hempel | 137/525.7 X |
| 2,807,500 | 9/1957 | Clayton | 239/212 X |
| 2,941,727 | 6/1960 | Zybach | 239/212 X |
| 3,349,794 | 10/1967 | Behlen | 137/344 |
| 3,417,766 | 12/1968 | Purtell | 239/212 X |
| 3,444,941 | 5/1969 | Purtell | 239/212 X |
| 3,447,751 | 6/1969 | Wieck | 239/212 |
| 3,463,175 | 8/1969 | Rogers | 137/344 X |
| 3,498,542 | 3/1970 | Hefner et al. | 239/212 |

*Primary Examiner*—Samuel Scott
*Attorneys*—Clarence A. O'Brien and Harvey B. Jacobsen ABSTRACT: An elongated pipe boom provided with irrigation sprinkler heads thereon supported by a plurality of driven wheeled assemblies including a central driven unit having a pickup shoe thereon for receiving water from a supply pipe with the entire assembly being driven back and forth in a linear direction in relation to an area to be irrigated. All of the supporting assemblies are retained in alignment by a timing mechanism and a control is provided so that the pump associated with the pickup shoe and the water supply line will have an intake capacity balanced with the water supply so that the pickup shoe will not intake air into the system.

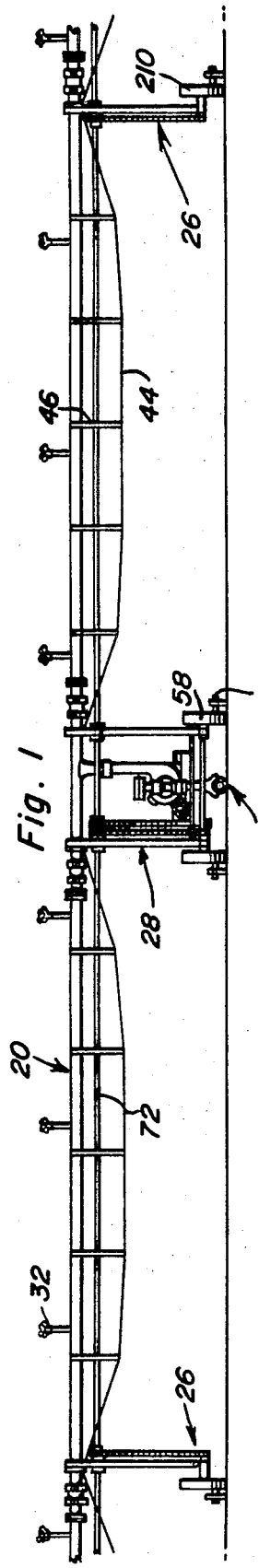
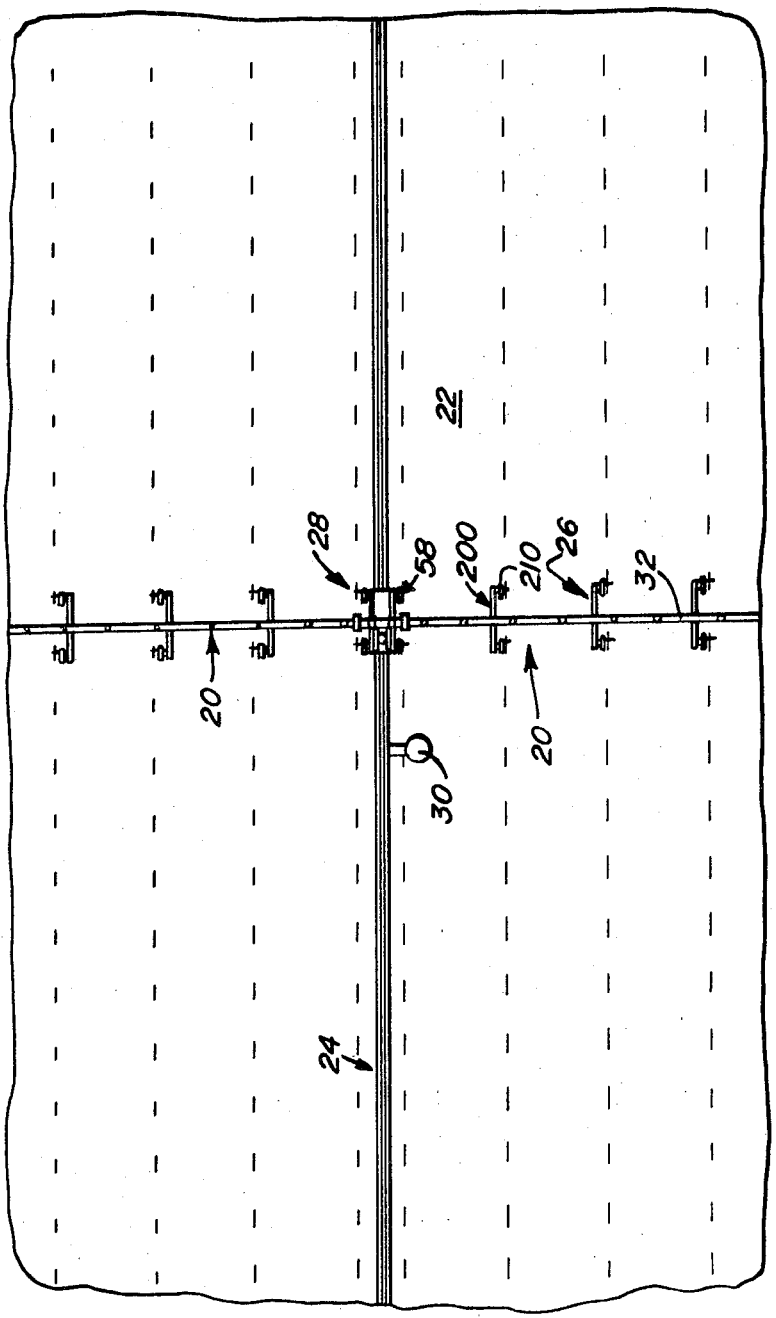
Fig. 1
Fig. 2
Richard F. Reinke
INVENTOR.

Richard F. Reinke
INVENTOR.

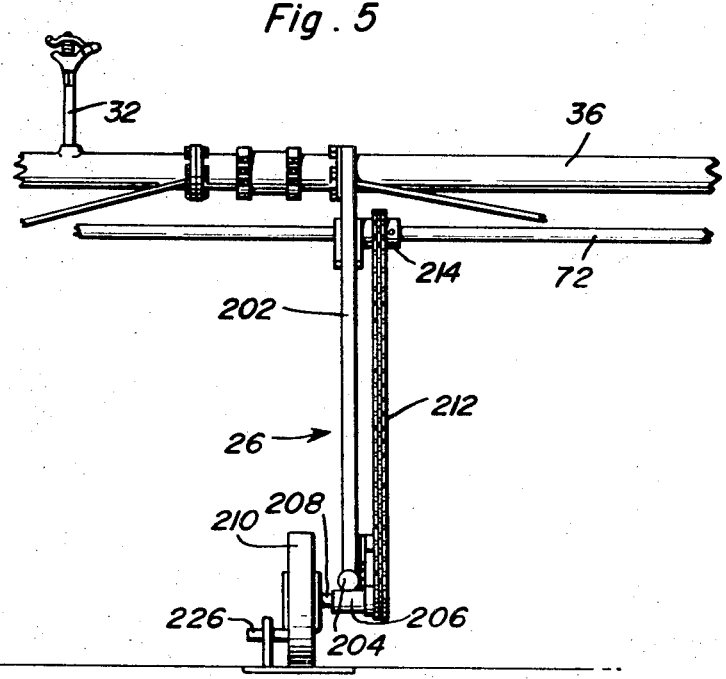
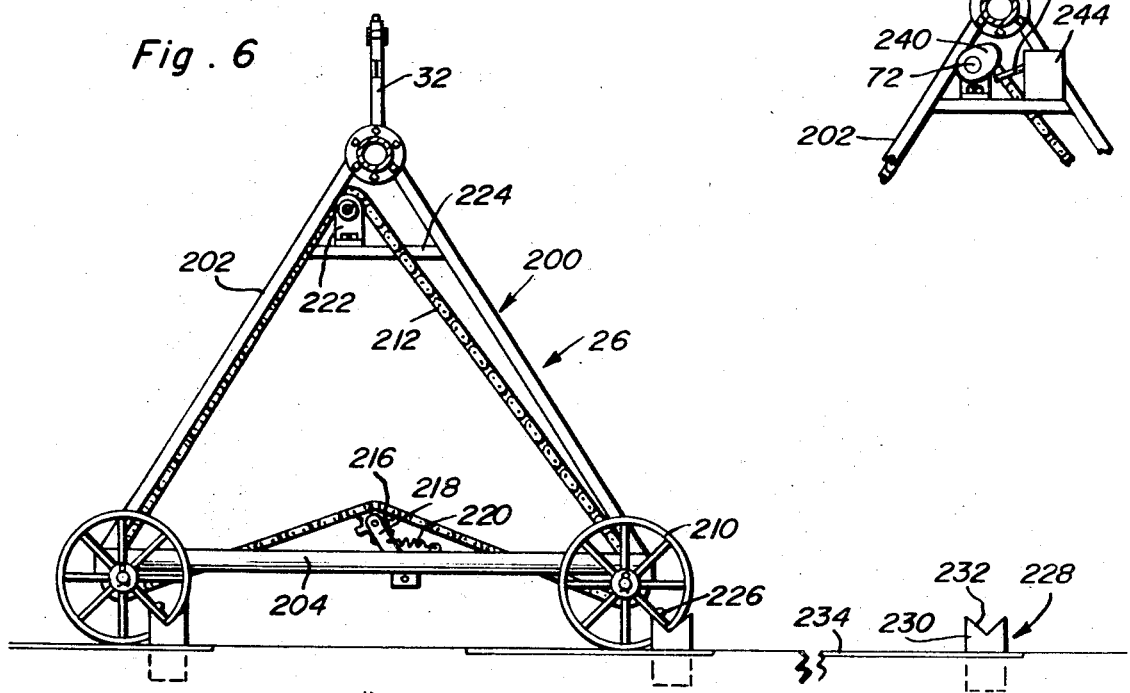
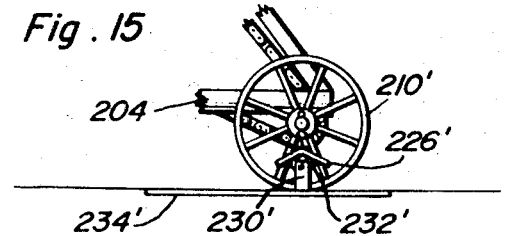
Richard F. Reinke
INVENTOR

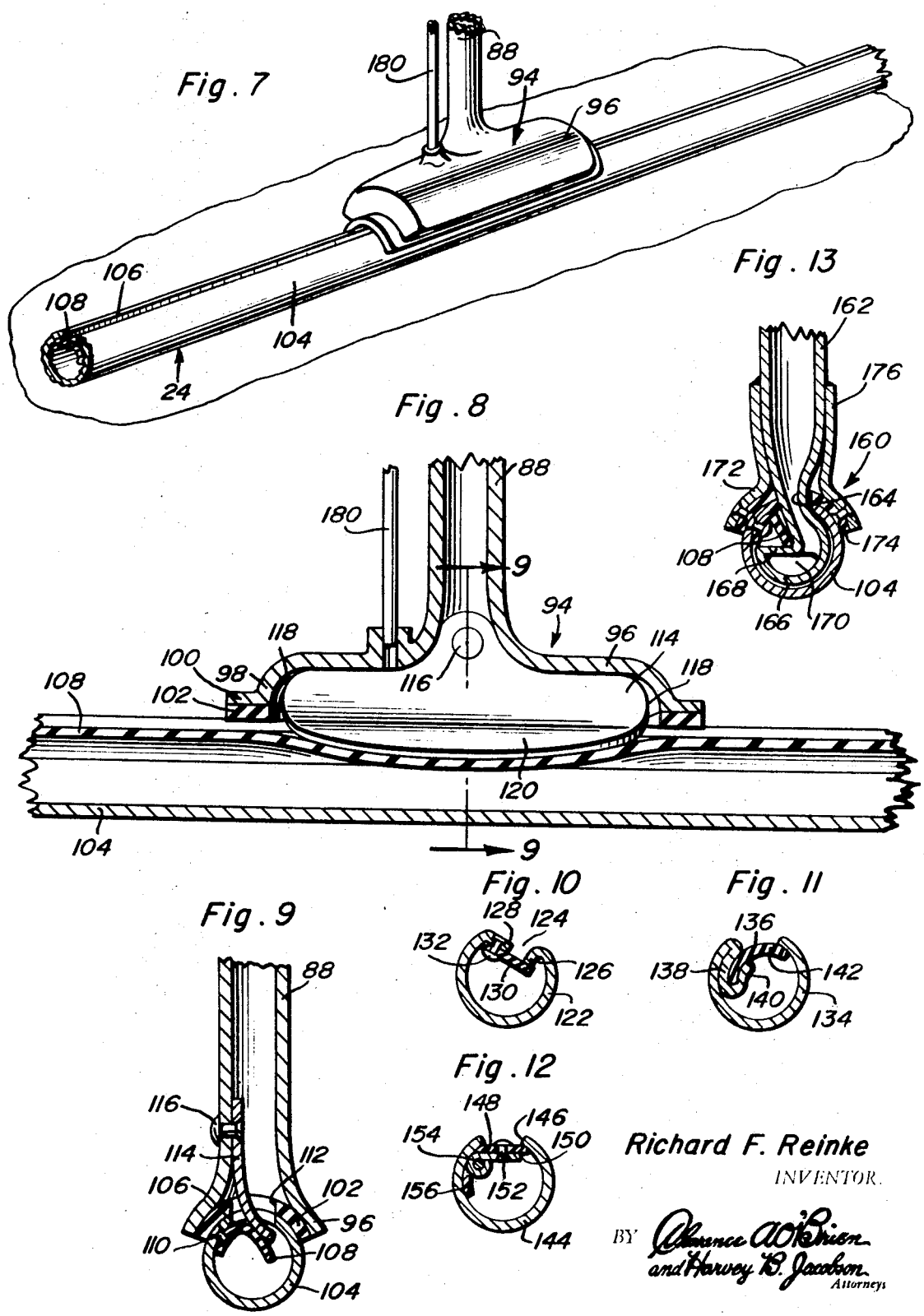

LINEAR IRRIGATION SYSTEM WITH PICKUP SHOE

The present invention generally relates to an irrigation system and more particularly, an irrigation system incorporating an elongated boom that extends transversely of an area to be irrigated and is driven back and forth in a linear direction in relation to the area and including a water pickup assembly for receiving water from a water supply pipe disposed longitudinally of the area to be irrigated.

Self-propelled irrigating apparatuses in the form of an elongated pipe boom having a plurality of sprinkler heads or nozzles thereon for travel above ground surface are generally known. Most of the development in this type of irrigation system has included the provision of a pipe boom rotatable about a centrally disposed standpipe so that a circular area is irrigated. While such circular irrigating device have met with some success, various problems have arisen in the use of such devices. For example, in view of the length of the boom, it is necessary to form the boom of sectional pipe or at least provide some means for retaining the boom in a substantially straight condition. Another problem is that most land areas employed in crop production are square or rectangular thus leaving corner areas improperly irrigated.

Accordingly, an object of the present invention is to provide an irrigation system which moves in a linear direction rather than in a circular direction with the path of movement being reversible so that the boom which extends transversely of the area being irrigated may be propelled back and forth in a linear path from one end of the area to the other thus effectively irrigating rectangular, square or other polygonal shapes of areas in which crop production is desired.

Another object of the present invention is to provide an irrigation system in accordance with the preceding object having a central supply pipe located in the area to be irrigated and defining the path of movement of the pipe boom and sprinkler head thereon together with a pickup shoe for supplying water from the supply pipe to a pump mounted on and driven from the prime mover carried by the central driven support for the irrigation pipe boom.

Still another object of the present invention is to provide an irrigation system which the driven supporting towers are associated with ground-installed devices for retaining all of the supporting assemblies in a timed and aligned relation.

Still another important object of the present invention is to provide an irrigation system including a control for balancing the pump capacity with the quantity of water being supplied to the supply pipe to avoid formation of the vacuum in the supply pipe thereby eliminating intake of air into the irrigation system.

A further important feature of the present invention is to provide an irrigation system which is relatively simple in construction, effective for irrigating rectangular or other polygonal areas, dependable and long lasting and relatively inexpensive to manufacture, operate and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is an elevational view of the central portion of the irrigation system of the present invention illustrating the association of the pipe boom, central driven tower with the pump and drive mechanism associated therewith and outer driven towers;

FIG. 2 is a top plan view of the irrigation system of the present invention illustrating the association of the area being irrigated and the irrigation apparatus;

FIG. 5 is an end elevational view of one of the outer supporting towers;

FIG. 6 is a side elevational view of the construction of FIG. 5;

FIG. 7 is a perspective view illustrating the association of the pickup shoe and supply pipe;

FIG. 8 is a longitudinal sectional view of the assembly of FIG. 7;

FIG. 9 is a vertical sectional view taken substantially upon a plane passing along section line 9-9 of FIG. 8 illustrating further structural details of the pickup shoe;

FIG. 10 is a transverse sectional view illustrating the modified form of water supply pipe;

FIG. 11 is a sectional view similar to FIG. 10 but illustrating another embodiment of the pipe;

FIG. 12 is a transverse sectional view similar to FIGS. 10 and 11 and illustrating another embodiment of the supply pipe;

FIG. 13 is a sectional view similar to FIG. 9 and illustrating another form of the pickup shoe;

FIG. 14 is a fragmental elevational view illustrating a cam mechanism associated with a time delay switch to stop the system in the event the switch is not actuated at periodic intervals by the cam; and FIG. 15 is a fragmental elevational view illustrating a modified form of timing mechanism for the drive wheels on the towers.

Figure 3:
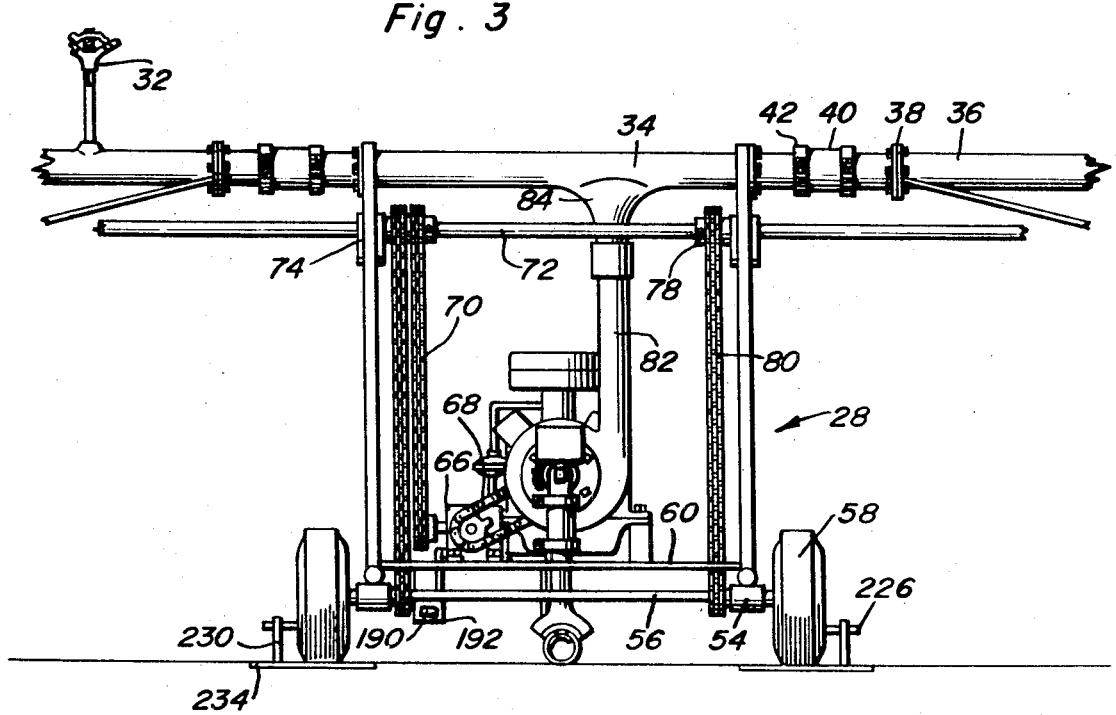
FIG. 3 is an enlarged elevational view of the central drive tower illustrating the prime mover thereon, the pump and associated pickup shoe.

Referring now specifically to the drawings, the irrigation system of the present invention includes an elongated boom generally designed by the numeral 20 supported transversely of a generally rectangular area 22 to be irrigated and driven for linear movement back and forth between the ends of the area 22. The area 22 has a central supply pipe generally designated by the numeral 24 associated therewith and the boom 20 includes a plurality of driven tower supports generally designated by the numeral 26 on either side of the supply pipe 24 and a central tractor or drive tower generally designated by the numeral 28 associated with the central supply pipe 24 which may be supplied with water under pressure from a well 30 or the like. Supported along the boom 20 is a plurality of sprinkler heads or nozzles 32 oriented in desired pattern for enabling discharge of a desired quantity of water onto a desired area being traversed during each cycle of movement of the boom 20. The boom 20 is automatically reversed when it approaches either end of the area 22 so that operation of the device will be substantially automatic thus eliminating the necessity of close supervision by an operator.

The pipe boom 20 includes a rigid central pipe 34 extending across the top of the central tractor or tower 28 and being connected to a plurality of outboard pipe sections 36 by a flange coupling 38 and a flexible coupling 40 which is in the form of a short flexible tubular member clamped to adjacent pipe sections by clamp members 42 and provided with an articulate connection interiorly thereof. The flexible coupling 40 is the same as the flexible hose connection and associated plate and hooks disclosed in my copending application Ser. No. 792,013 filed Jan. 17, 1969. Also, each pipe section 36 is provided with tension members such as cables or rods 44 connected to the flanges 38 and extending downwardly and connected to the brace members 46 which structure is the same as the brace assemblies and tension members disclosed in the aforementioned copending application whereby the pipe sections 36 form the upper chord of a truss and may be slightly bowed upwardly especially when empty so that the weight of the water will orient the pipe section 36 in substantially horizontal position. The particular structural details of the sprinkler heads 32 form no specific part of the invention and any suitable conventional sprinkler head assemblies may be employed.

Figure 4:
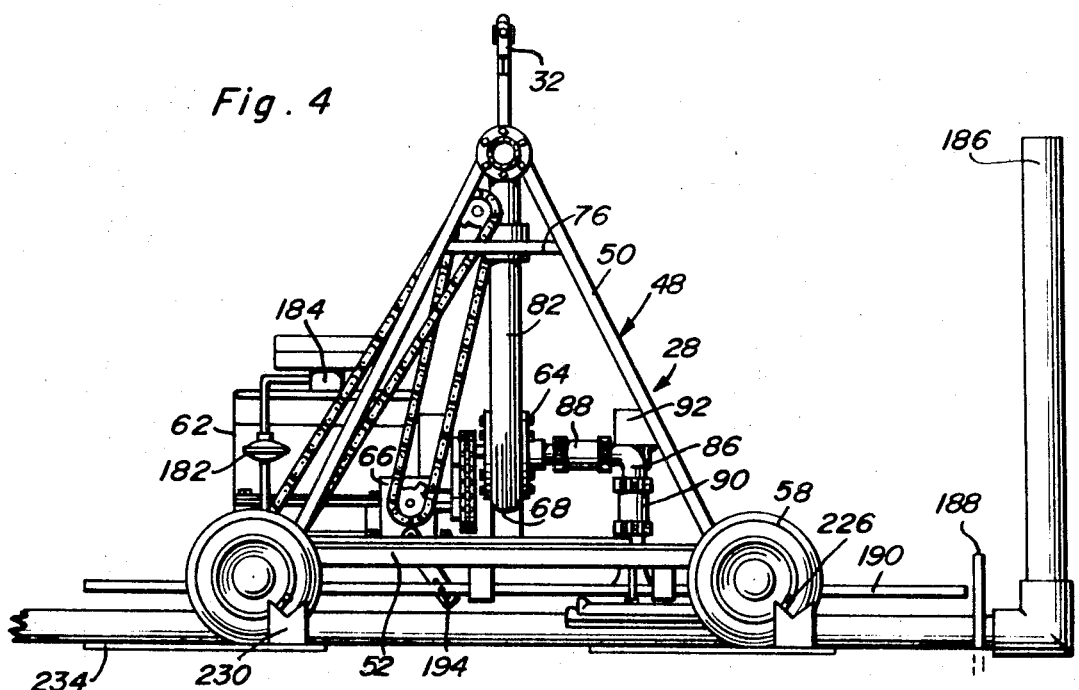
FIG. 4 is a side elevational view of the construction of FIG. 3.

The central tower or tractor 28 includes a rigid framework generally designated by the numeral 48 and which includes downwardly diverging end frame members 50 which are rigid with the pipe section 34. The lower ends of the diverging end frame members 50 are rigidly interconnected by a fore-and-aft frame member 52 thus forming a rigid triangular frame at each end of the pipe section 34. Each end of the frame member 52 is provided with a bearing assembly 54 rotatably journaling axles 56 thereon with each axle 56 having a ground-engaging wheel 58 on each end thereof. As illustrated in FIGS. 3 and 4, the axles 54 are disposed above the supply pipe 24 and the wheels 58 are disposed on opposite sides of the supply pipe 24.

Additional transverse supporting frame members 60 are provided between the frame members 52 to form a rigid framework structure for supporting a prime mover such as an internal combustion engine 62 which drives a centrifugal pump 64 disposed in alignment therewith. The engine 62 also drives a gearbox 66 through a chain drive assembly 68. The gearbox 66 has a drive sprocket engaging an upwardly extending drive chain 70 which engages a sprocket carried by an elongated drive shaft 72 journaled from suitable bracket and bearing structures 74 carried by the frame members 50 with short frame members 76 being provided for supporting the bearing brackets 74.

The drive shaft 72 has two sprocket gears 78 rigidly affixed thereto for receiving downwardly extending drive chains 80 which engage drive sprocket gears on one of the axles 56 thus driving the wheels 58 from the drive shaft 72. As illustrated, the drive shaft 72 closely parallels the pipe sections 34 and 36 and if desired, universal couplings may be incorporated therein wherever desired especially in the areas generally aligned with the flexible couplings 40.

The pump 64 has a discharge pipe 82 extending tangentially from the casing to the pipe 34 with the discharge 82 being connected thereto in any suitable manner such as a smoothly curved branch line 84 whereby water discharged will flow substantially equally in both directions in the boom. The intake of the pump 64 includes an L-shaped conductor 86 having a flexible coupling 88 in the horizontal portion thereof and a flexible coupling 90 in the vertical portion thereof and a weight 92 mounted at the right-angular corner thereof as illustrated in FIG. 4. The lower end of the intake pipe or conduit 86 is provided with a shoe generally designated by the numeral 94 for picking up water from the supply pipe 24. The shoe 94 is a longitudinally elongated and transversely arcuate member 96 having downturned peripheral flanges 98 terminating in outturned flanges 100 at the ends thereof thus defining an arcuate hollow member with a peripheral seal 102 in the form of a resilient gasket of neoprene, rubber or the like disposed between the undersurface of the shoe 94 and the top surface of the supply pipe 24 so that the shoe 94 may pick up water from the supply pipe 24.

The supply pipe 24 is in the form of a tubular pipe 104 having a longitudinal slot 106 formed in the upper surface thereof. The slot 106 is closed by a resilient closure member 108 generally in the form of a resilient flap which is longitudinally continuous and attached to the inner surface of the pipe 104 adjacent the edge of the slot 106 by rivets 110 or the like. As illustrated in FIG. 9, the peripheral gasket 102 also has a slot 112 therein corresponding in width to the slot 106 in the pipe 104 for registry therewith.

The pressure of the water within the pipe 104 will retain the closure flap 108 normally in closed position. For depressing the closure flap 108 and allowing water to flow from the pipe 104, the interior of the shoe 94 is provided with a depressing tongue or finger 114 in the form of a plate having the upper end secured to the shoe or tubular member by a rivet 116. The plate generally is elongated and conforms with the shape of the member 96 with the ends thereof being rounded as at 118 and the lower edge thereof being laterally curved and also longitudinally curved as at 120 to depress only that area of the closure flap 108 under the shoe 94 and within the confines of the sealing gasket 102 so that as the shoe 94 slides longitudinally along the surface of the pipe 104, the flap 108 will be depressed and water will flow into the intake pipe 88 without any substantial leakage onto the ground surface.

While various materials may be employed, it has been found that rubber belting material such as normally employed in conveyor belts or the like is sufficiently flexible and has wear characteristics which enable effective use over relatively long periods of time. The pipe 104 may also be constructed of various materials but it has been found that steel pipe serves quite adequately for this purpose.

FIG. 10 illustrates a supply pipe 122 having a slot 124 defined by an inturned flange defining an edge of the slot designated by numeral 126 and also an angulated flange 128 opposed thereto to which the closure flap 130 is attached by a rivet 132 or the like with it being understood that the flanges 126 and 128 as well as the flap 130 being continuous and secured in place by a plurality of rivets 132. In this construction, the flap closes against the free edge of the flange 126.

FIG. 11 illustrates a supply pipe 134 having a slot 136 formed therein with one edge of the slot 136 being formed by a reversely bent flange 138 extending along a portion of the inner surface of the pipe with the flange 138 terminating in a reversely folded or bent flange 140 which clampingly engages one edge of the closure flap 142.

FIG. 12 illustrates a supply pipe 144 having a continuous entrance slot 146 formed therein with a closure flap 148 being riveted to a hinge strap 150 by rivets 152. The hinge strap is pivotally connected by a hinge pin 154 to an arcuate hinge strap 156 rigidly secured to the interior surface of the pipe 114 as by welding, riveting or the like thus forming a swingable flap 148 carried by the pivotal hinge strap 150.

FIG. 13 illustrates a water supply pipe which may be any one of the water supply pipes disclosed but for illustrative purposes, the water supply pipe illustrated in FIG. 13 is designated by the numeral 104 in that it is the same as the structure of the water supply pipe illustrated in FIGS. 7—9. In this embodiment of the invention, the pickup shoe is generally designated by the numeral 160 and in this construction, the pump intake pipe 162 is narrowed at the lower end thereof as at 164 and extends through the open slot 106 and terminates in an open-ended intake shoe 166 which has a lower surface conforming with the interior surface of the bottom of the pipe 104 and a substantially flat upper wall 168 which extends under the free edge of the flap 108 so that water may be taken into each open end 170 of the arcuate shoe 166. An arcuate member 172 having a gasket or seal 174 on the undersurface thereof engages the pipe 104 on either side of the slot 106 and across the ends of the arcuate member 172 to prevent leakage of water. The arcuate member 172 has a sleeve 176 that is secured to the intake pipe 162 as illustrated in FIG. 13.

The type of pickup shoe illustrated in FIG. 13 is extended to the bottom of the pipe to pick up water from the bottom half of the pipe by having the intake openings 107 at each end thereof thus assuring that a water supply will be available to the inlet pipe of the pump even though the supply pipe 104 may not be completely full of water.

To further control operation of the pump 64, a vacuum line 180 is communicated with the interior of the shoe 94 and is communicated with a diaphragm assembly 182 that is operatively associated with the carburetor 184 or other speed control mechanism for the engine 62. This tube which registers pressure and vacuum will activate the diaphragm 182 and opens the throttle or carburetor setting to increase the engine speed as the pressure increases in the main supply pipe 104. Conversely, the vacuum tube will operate the diaphragm to decrease the engine speed as the pressure decreases in the main supply pipe. This arrangement is especially important in uneven terrain such as hilly ground and serves generally as a neutral between pressure and vacuums so that the pump 64 will pump exactly the same amount of water as is fed into the supply line 104. Thus, the intake or suction of the pump is maintained in substantially perfect balance with the water supply available at the location of the pickup shoe 94 so that the pickup show will not take air into the system which could possibly cause the pump to lose suction and to also cause uneven discharge of water through the sprinkler heads and the like.

The water supply pipe 104 is provided with a vertical standpipe 186 at one end thereof to control the maximum pressure within the supply pipe thus controlling the amount of force necessary to open the closure flap as the shoe slides along the pipe. The height of the water column pipe may be varied depending upon the maximum pressure desired and if the pressure in the pipe exceeds the desired maximum, excess water will merely be discharged out of the upper end of the standpipe.

Also, the irrigation boom is reversed by reversing stakes 188 positioned at each end of the area 22 to be irrigated with the reversing stakes being aligned with and engaged by an elongated actuating rod 190 slidably supported by sleeve-type brackets 192 carried by the frame 48. The actuating rod 190 is connected to an actuating arm 194 connected with the transmission 66 which is a reversible transmission so that the direction of output of the transmission 66 may be reversed. Thus, as the central tower approaches one end of the supply pipe 104, the actuating rod 190 will engage the stake 188 and cause it to move inwardly toward the tower thus reversing the transmission and reversing the tower so that it progresses in the other linear direction. Thus, by varying the position of the stakes as desired, any portion of a particular area having a supply pipe may be irrigated and it is pointed that any suitable type of stop mechanism may be provided in an adjustable stationary potion for serving as an abutment to operate the reversing rod 190.

Each of the towers 26 include a generally triangular frame structure generally designated by the numeral 200 and including two downwardly diverging frame members 202 interconnected at their lower ends by a fore-and-aft frame member 204 having supporting sleeves 206 thereon journaling stub axles 208 carrying driven support wheels 210. Each of the stub shafts or axles 208 have a sprocket gear on the end thereof opposite from the wheel 210 and is connected with a drive chain 212 which extends upwardly and over a sprocket 214 carried by the drive shaft 72. The chain 212 generally extends along the frame members 202 and 204 with the horizontal portion of the chain extending between the wheels being entrained over a slack takeup sprocket gear 216 carried by a pivotally supported arm 218 and spring biased upwardly by a tension spring 220 thus maintaining tension and taking up slack in the drive chain 212. As illustrated in FIG. 6, the drive shaft 72 is supported in brackets or bushings 222 carried by horizontal supporting frame members 224. Thus, all of the wheels 210 are driven at the same speed by the same drive shaft 72.

For retaining the pipe sections 36 in alignment, each of the drive wheels 58 on tractor tower 28 and each wheel 210 on each tower 26 is provided with a laterally extending lug 226 that is attached to one of the spokes of the wheel or otherwise secured thereto inwardly of the periphery thereof. The lug 226 will move in a circular path and for each rotation or predetermined number of rotations of the wheels 58 and 210, the lug 226 will move a predetermined linear distance. In the event of slight slippage of the wheel, alignment members generally designated by the numeral 228 are provided in spaced relation along the linear path of movement of each of the wheels 58 and 210 with the alignment members being spaced apart a distance equal to the spacing between the lugs on adjacent wheels or a multiple of that distance so that the lugs 226 on both wheels will engage an alignment member at the same time. Each alignment member 228 includes an upstanding rigid member 230 having a V-shaped notch or crotch 232 on the upper end thereof for receiving the lug 226. The ground surface is provided with a rigid plate member 234 which is at a predetermined elevational relationship to the crotch or recess 232 so that even under muddy conditions, the wheels 58 and 210 will have a predetermined relationship to the alignment member 228. Thus, even if one of the wheels has slipped or if a plurality of the wheels have slipped, they usually will not slip sufficiently to miss the distance between the edges of the crotch 232. When they engage the v-shaped crotch 232, due to the driving engagement of the wheels, all of the lugs on all of the wheels will reach the bottom of the V-shaped crotch 232 at the same time thus retaining all of the wheels and all of the towers 26 in alignment with each other and with the center tower or tractor 28 thereby retaining the pipe boom in a substantially horizontally straight condition.

FIG. 15 illustrates a modified alignment structure in which the wheel 210' includes a laterally extending and radially outwardly opening V-shaped lug or plate 226' engaging an alignment member in the form of an upstanding support member 230' which has a roller 232'. A plate 234' is provided for engagement by the wheel 210' with the roller engaging the V-shaped lug 226' and operating in substantially the same manner as the structure illustrated in FIGS. 5 and 6.

FIG. 14 illustrates a safety device in the form of a cam 240 mounted on the drive shaft 72 at each tower associated with the operating arm 242 of a time delay switch 244 supported in any suitable manner on each tower. A control device is thus provided so that if the switch 244 is not activated at regular intervals by the cam 240, the switch will break a circuit that will stop the motor or shut down the system until whatever caused the improper operation has been rectified.

It is pointed out that the abutment 226' or the abutment 226' may be adjustably supported on the wheel or correspondingly, the elevational height of the alignment member may be adjusted to provide proper operation of the alignment device and the angle of the V-shaped crotch 232 or the V-shaped abutment 226' may be varied. Other variations may be used such as a V-shaped recess in the plate and a radial V-shaped projection on the periphery of the wheel all of which will serve to orient the wheels in relation to the surface being traversed during each rotation of the wheels thereby assuring alignment of the towers. Also, the safety device may be incorporated into any rotating component such as the wheels by providing a cam on the wheels to engage the operating arm of a time-delay switch.

While the structure has been described with all of the alignment devices such as the lugs 226 and crotches 232 operate in a manner so that all of the lugs 226 reach the bottom of the crotches at the same time for retaining all of the wheels of all of the towers in alignment with each other, it is pointed out that the arrangement of the lugs and crotches could be altered so that the lugs on certain of the wheels on certain of the towers will be engaged with the crotches 232 associated therewith while other of the lugs on other of the wheels on other towers may be in diametrically opposed relationship to the crotches 232 thereby providing an arrangement in which the lugs and crotches on certain wheels are engaged while the lugs and crotches associated with the other wheels are not engaged to provide an alterating alignment assembly.

Also, while sprocket and chain drive assemblies have been illustrated and specifically described in the specification, it is pointed out that gear and shaft drive assemblies may be employed with the meshing gears encased in a housing filled with oil or suitable lubricant. Regardless of whether a sprocket chain drive or a gear and shaft type drive is employed, there is a positive driving interconnection for all of the towers and the central tractor.

While not specifically illustrating, the flanged coupling 38 in the pipe boom 20 is preferably provided with the peripheral groove in the facing surfaces of the flanges with an O-ring seal of rubber or neoprene disposed therein to seal the flanged coupling 38.

By using a linear system, the span between towers may be 164 feet thus enabling crops to be farmed between the tracks of the wheels on the towers which will be in the form of permanent furrows and the like. With this arrangement, the path of movement of the towers remains constant thus eliminating damage and breakage to the device which frequently occurs in circular-type arrangements when the towers pass over gullies, ditches, or the like which may be formed by heavy rains. The engine or prime mover for powering the unit may be any suitable internal combustion engine such as a gasoline engine, diesel engine or the like or any other suitable type of motor, including an electric motor, hydraulic motor or the like. Adequate controls and safety devices are provided for the motor including the time-delay switches may ground the ignition system or cut out the fuel injection system of a diesel engine or otherwise render the system inoperative. The supply pipe may be formed on conventional pipe-forming equipment and the flexible flap may be any suitable long-lasting wearable material and the sealing gasket also may be constructed of a similar material.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What I claim as new is as follows:

1. An irrigation system comprising an elongated pipe, a plurality of wheeled supports for said pipe, means driving said supports, and means communicating the elongated pipe with a source of water, and a plurality of alignment means mounted in spaced linear relation along the path of movement of the wheeled supports over the area to be irrigated, each of said supports including means engaging the alignment means for retaining the pipe in substantially straight condition.

2. The structure as defined in claim 1 wherein said alignment means includes a plurality of stationary members disposed in aligned relation, said means on each support including a projection engageable with the spaced members for adjusting the position of each support in relation to each of said members whereby each of the supports will be positioned in the same relationship to each of the stationary members thereby aligning the supports with each other.

3. The structure as defined in claim 2 wherein each of said wheeled supports includes a wheel thereon, said projection extending laterally from the wheel, each of said members being in the form of an upstanding member having an upper end adapted to receive and position the projection on the wheel as the wheel is driven so that the projection on the wheel on each of the supports will be released from the upstanding member at the same time.

4. In a linear irrigation system, a water supply pipe adapted to extend in substantially a straight line from one edge portion of an area to be irrigated to another edge portion, said pipe including a longitudinally continuous slot adjacent the upper portion thereof, and a longitudinally continuous, normally closed closure member extending throughout the length of the slot and disposed in closed relation to the slot by pressure of water in the pipe.

5. The structure as defined in claim 4 wherein said closure member is in the form of a flexible flap having one longitudinal edge attached to the pipe and the other edge being free of the pipe and engaging the inner surface of the pipe so that the flap bridges the slot.

6. The structure as defined in claim 5 together with a pickup shoe slidably engaging said pipe in bridging relation to the slot, a water intake pipe extending upwardly from the shoe for receiving water from the shoe, and means carried by said shoe engaging the closure member and forcing the free edge thereof downwardly away from the interior surface of the pipe to open the slot to enable discharge of water from the interior of the pipe into the shoe and intake pipe.

7. The structure as defined in claim 6 wherein said shoe is hollow and provided with an arcuate configuration, a seal member engaged between the periphery of the shoe and the pipe for sealing the shoe peripherally, said means for opening the closure member being disposed within the peripheral confines of the shoe.

8. The structure as defined in claim 7 wherein said means for opening the closure member includes a downwardly extending projection extending into the pipe and engaging the outer surface of the closure member for depressing the free edge of the closure member to an open position.

9. The structure as defined in claim 8 wherein said projection is in the form of a hollow member having a curved portion extending around the interior periphery of the pipe and terminating in an elongated tubular member having open ends and an arcuately curved bottom surface conforming with the interior bottom surface of the pipe to provide an intake for water at the bottom portion of the pipe to enable intake of water even though the pipe is not completely full.

10. The structure as defined in claim 6 together with a pump communicated with the intake pipe, a prime mover for driving said pump, a carriage supporting the pump and prime mover with the prime mover serving to drive the carriage along the slotted pipe, an elongated transversely extending discharge pipe carried by the carriage and being communicated with the discharge of the pump, said elongated pipe having a plurality of discharge heads thereon for discharging water therefrom, said elongated pipe including a plurality of sections interconnected by flexible couplings, the sections of the pipe being supported outwardly of the carriage by a plurality of wheeled towers, means driving each of the wheeled towers, and alignment means mounted stationarily in relation to the area to be irrigated along the path of movement of each driven tower, and means associated with each tower and each alignment means for orienting each tower in relation to the alignment means during movement thereof for maintaining the towers in alignment with each other and in alignment with the carriage.

11. The structure as defined in claim 10 wherein said alignment means includes a plurality of upstanding members mounted on a rigid baseplate supported in the area to be irrigated, said means associated with each tower and each alignment means including at least one wheel means on each tower and a projection on each wheel means engaging the upstanding members during movement of the wheeled towers and aligning all of the wheeled towers at each upstanding member.

12. The structure as defined in claim 11 wherein said wheel means is in the form of a wheel and said projection is a laterally extending projection, said upstanding member and laterally extending projection having coacting cam means to accurately align the wheeled towers with each other at each of the alignment means.

13. The structure as defined in claim 12 wherein said means for driving the wheeled towers is a single drive means whereby the association of the alignment means and the means on each tower will enable the single drive means for all of the towers to assure that each tower has the same relationship with the alignment means at each of the alignment means as the towers traverse the area being irrigated.